Oct. 28, 1941.   C. L. WALKER   2,260,983
CONTROL MEANS FOR INTERNAL COMBUSTION ENGINES
Filed March 22, 1939   2 Sheets-Sheet 1

INVENTOR.
Clinton L. Walker
BY
Harness, Dickey & Pierce
ATTORNEYS.

Oct. 28, 1941.  C. L. WALKER  2,260,983
CONTROL MEANS FOR INTERNAL COMBUSTION ENGINES
Filed March 22, 1939  2 Sheets-Sheet 2
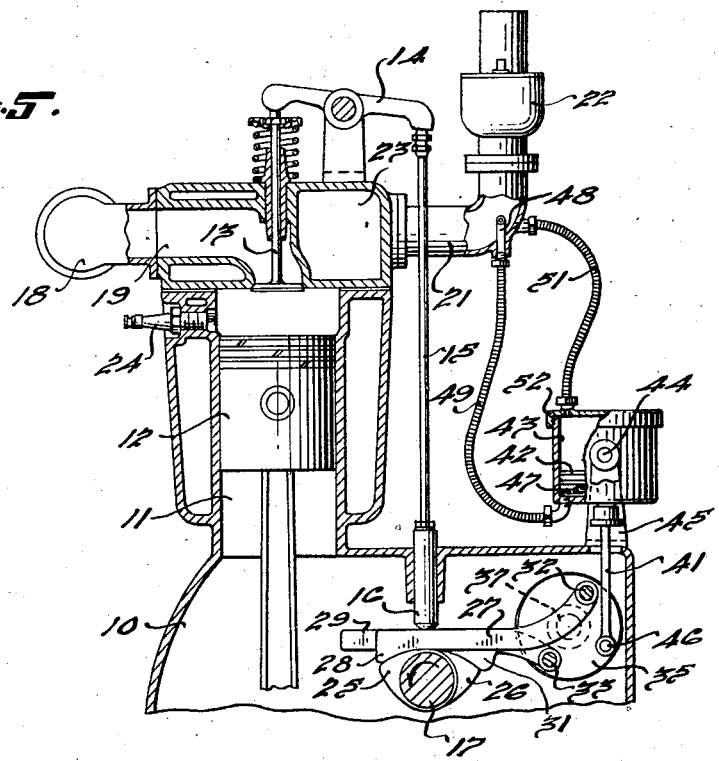
INVENTOR.
Clinton L. Walker
BY Harness, Dickey & Pierce.
ATTORNEYS.

Patented Oct. 28, 1941

2,260,983

UNITED STATES PATENT OFFICE 2,260,983

CONTROL MEANS FOR INTERNAL COMBUSTION ENGINES

Clinton L. Walker, Piedmont, Calif.

Application March 22, 1939, Serial No. 263,421

14 Claims. (Cl. 123—98)

My invention relates to internal combustion engines, and more particularly to means for controlling the operation of the valves relative to engine speed and throttle opening.

It is well-known that the opening of the intake and the closing of the exhaust valves of an internal combustion engine may, without much inefficiency in operation, remain fixed relative to top center as is now the common practice in internal combustion engine design. However, this is not the case with the closing of the intake and opening of the exhaust valves, and my present invention pertains particularly to the control of such closing and opening. As the speed of the engine changes under reduced load or increased throttle opening the exhaust valve opening and the intake valve closing should likewise change in a predetermined manner. The variation in exhaust valve opening and intake valve closing is accomplished by a device and method embodying my invention.

It is well-known in the art that the time of opening the exhaust valve in degrees before bottom center and the closing of the intake valves in degrees after bottom center is dependent upon engine speed. Slow speed engines may open their exhaust valves and close their intake valves at bottom center, or nearly so, while high speed engines should have their exhaust valves open as much as 70 degrees before bottom center and their intake valves closed as much as 70 degrees after bottom center. It is, of course, impossible to provide the correct exhaust valve opening and the intake valve closing throughout the range of engine speed with a fixed position of opening as provided in the present day type of internal combustion engines. In the present day engines such points of opening and closing are usually a compromise between the high and low speed requirements.

The time of opening of the exhaust valves and the closing of the intake valves is also dependent upon the throttle position controlling the engine operation. On full throttle it is very evident that the exhaust valves should be opened early to allow the large mass of exhaust gases to escape and to reduce the exhaust pressures above atmosphere at bottom center than would be required on part throttle where the mass of gas to be exhausted and the pressure thereof is materially less. It, therefore, is apparent that the opening of the exhaust valve and the closing of the intake valve before and after bottom center, respectively, are functions not only of engine speed but also of throttle position. High engine speed, coupled with a heavy load, will require longer intake and exhaust periods than a slower engine speed with a lighter load. To obtain longer opening periods it would be advisable to open the exhaust valves early and close the intake valves later, leaving the exhaust closing and intake opening remain fixed adjacent to top center. It is, however, within the purview of my invention to vary the period of exhaust closing and intake opening near top center relative to some function of engine speed and load.

A system of levers is preferably employed of predetermined contour relative to the contour of the cams on the cam shaft of the engine, mounted between the cams and the valve tappets. Means are provided for shifting the levers relative to the cams to thereby change their relative positions and the period of opening and closing of the valves. While this shifting may be performed manually, I preferably provide automatic means for producing the actuation so as to provide for the maximum efficiency in the operation of the engine at all speeds and throttle openings. Such a result may be obtained by providing a piston and cylinder for actuating an arm which produces the shifting of the lever. The position of the piston changing with changes in the velocity of flow of fuel and its pressure in the engine manifold. Instead of operating the arm direct, the variations between the velocity of the fuel and its pressure may be employed to actuate a valve to control a flow of fluid on the valve, which operates the levers to produce its actuation, which changes the degree of valve opening. In the latter instance assurance is had that sufficient pressure is available to produce shifting of the levers on the cams. When it is desired to control both the opening and closing of the intake and exhaust valves, a pair of levers may be employed between each valve tappet and cam, to thereby function to completely control the period and position of valve actuation under all conditions of engine operation.

Accordingly, the main objects of my invention are; to provide means for controlling the opening and closing of the intake and exhaust valves as a function of engine speed; to provide means for varying the angular position for opening the exhaust valves and closing the intake valves in accordance with engine speeds and throttle openings; to provide levers between the cam shaft and tappet ends which are adjustable to vary the period of opening of the exhaust valves and the closing of the intake valves; to provide automatic means for shifting cam levers relative to the cams of the cam shaft to automatically compensate for changes in engine speed and throttle opening; to provide means responsive to engine speed and throttle opening to operate a fluid valve for controlling the movement of cam levers for regulating the periods of operation of the valves in a manner which is a function of the engine operation; to provide a pair of cam levers between the cams of the cam shaft and the tappets of valves which are shiftable to control both the opening and closing of both the intake and exhaust valves through manual or automatic operation; and in general, to provide manual or automatic means for varying the operation of the valves of an engine in accordance with engine speeds and throttle openings and variations thereof, all of which is simple in construction, positive in operation, and economical of manufacture.

Other objects and features of novelty of my invention will be either specifically pointed out or will become apparent when referring, for a better understanding of my invention to the following description taken in conjunction with the accompanying drawings, wherein:

Fig. 5 is a sectional view of an internal combustion engine embodying the structure illustrated in Fig. 1 in combination with automatic means for effecting the operation of the levers thereof; and, Fig. 6 is a view of structure similar to that illustrated in Fig. 5, showing a modified form thereof.

Figure 1:
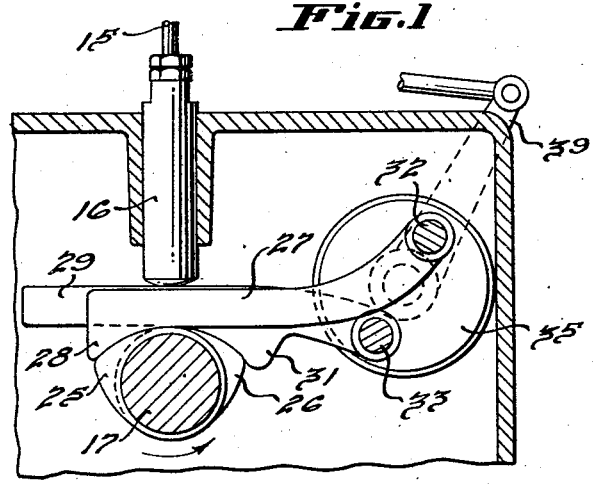
Figure 1 is a broken sectional view in elevation of a cam shaft and valve tappet having mechanism embodying my invention associated therewith.

Referring to Fig. 5, I have illustrated an engine 10 embodying conventional cylinders 11, pistons 12, intake and exhaust valves 13 operated through rocker arms 14, push rod 15, and tappets 16 from a cam shaft 17. An exhaust manifold 18 is connected to the exhaust ports 19 while an intake manifold 21 delivers fuel from a carburetor 22 to the intake orifices 23. In the Otto-cycle type of engine spark plugs 24 are connected in the head or the wall of the cylinder in a position to ignite the fuel.

The cam shaft 17 has intake valve actuating cams 25 and exhaust valve actuating cams 26 of the conventional type. Each cam 25 and 26 is aligned with a tappet 16 to operate in the conventional manner. To obtain the variation in valve operation in accordance with my invention as explained above, I interpose cam following levers between the cams and the tappets. Intake cam following levers 27 are disposed between the cams 25 and the tappets 16 operating the intake valves. Each intake cam following lever 27 has a cam 28 thereon which changes position relative to the cams 25 as the cam following levers 27 are advanced or retracted along a path normal to the axis of the tappets. Exhaust cam following levers 29 are disposed between the cams 26 and the tappets 16 operating the exhaust valves. Each exhaust cam following lever 29 has a cam 31 thereon which changes position relative to the cams 26 as the cam following levers 29 are advanced or retracted in a path normal to the tappets 16. For operating the cam following levers 27 and 29 a pair of shafts 32 and 33 are mounted on end plates 34 and 35 carrying stub shafts 36 and 37 which are journalled in the wall of the engine casing as illustrated in Fig. 3.

Figure 3:
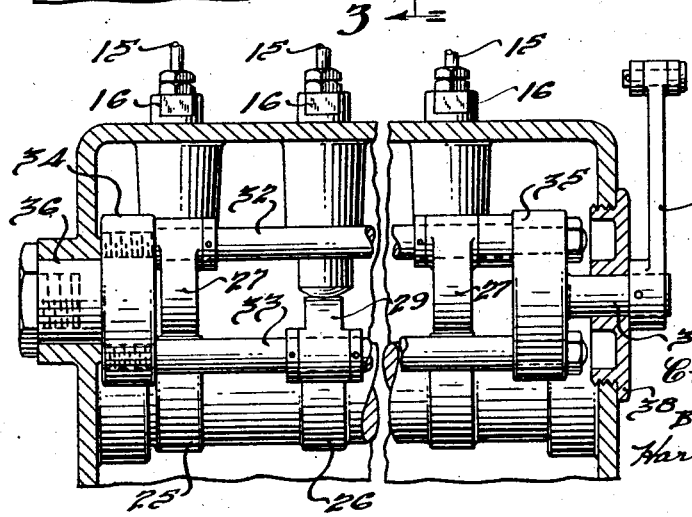
Fig. 3 is a broken sectional view of the structure illustrated in Fig. 2, taken on the line 3—3 thereof.

In Fig. 3 I have illustrated a plug type of journal 38 for the shaft 37 which provides an opening through which the plate 35 is inserted to be assembled on the ends of the shaft 32 and 33. An operating lever 39 is connected to the end of shaft 37 for producing rotation of the plates 34 and 35 and the revolution fo the shafts 32 and 33 which adjusts the cam following levers 27 and 29 in opposite directions to increase or decrease the spacing of the cams thereof with those of the cam shafts 17. That is to say, the spacing between the cams is increased or decreased each time the cam following levers 27 and 29 are shifted, which shifting always occurs in the opposite direction relative to each other.

Figure 4:
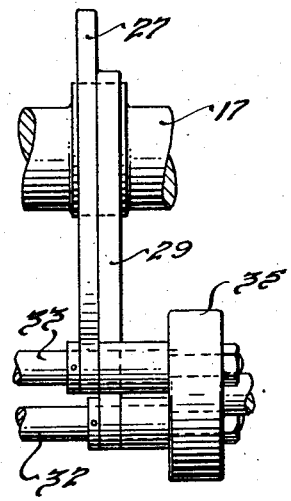
Fig. 4 is a view of structure similar to that illustrated in Fig. 3 showing a modified form thereof.

In Fig. 4, I have shown a further form which my invention may assume when the opening of the intake and the closing of the exhaust valves is also to be varied. For this arrangement, each cam 25 and 26 has interposed between its cam surfaces and the tappet 16 a pair of the cam following levers 27 and 29 whereby, upon the rocking of the plates 34 and 35, the cams 28 and 31 will shift relative to each of the cams 25 and 26 to thereby vary the time of the opening and closing of both the intake and the exhaust valves.

While the operating lever 39 may have a rod extending into the cab of the vehicle, to be manually actuated by the operator, I preferably produce the automatic operation of the cam following levers in accordance with engine operation. In this manner, the personal equation of the operator is entirely eliminated and more accurate valve movement results from the automatic actuation of the cam following lever in accordance with engine operation. When automatic operation is employed, the plates 34 and 35 are rotated by a piston rod 41 as illustrated in Fig. 5. The piston rod is connected to a piston 42 operating within a cylinder 43.

The cylinder is provided with trunnions 44 journalled in brackets 45 which permit the cylinder to oscillate as the pivot 46 connecting the end of the piston rod 41 to the plate 35 swings about the stub shaft 37. A spring 47 is disposed in the bottom of the cylinder 43 beneath the piston 42 for urging the piston upwardly. The upward movement of the piston rotates a plate 35 in a counter-clockwise direction separating the cams 28 and 31 from the cams 25 and 26 to thereby decrease the time of valve opening. Downward movement of the piston rod 41 moves the cams closer together and thereby increases the valve opening.

A Pitot tube 48 is disposed within the manifold 21 as illustrated in Figs. 5 and 6, substantially central of the cross sectional dimension thereof. A flexible tube 49 connects the Pitot tube to the bottom of the cylinder 43 to control the pressure below the piston 42. A flexible tube 51 is connected to the wall of the manifold 21 and to a cap 52 forming the top of the cylinder 43. The tube 51 controls the pressure on the top of the piston 42.

The pressure beneath the piston 42 is regulated by the change of pressure in the tube 49 resulting from the Pitot tube being disposed in the path of flow of fuel to the pistons and is thereby a measure of the velocity of such flow. The pressure in the tube 51 is that of the manifold which fluctuates in accordance with engine operation.

When the engine is operating under normal load a vacuum or depressed condition is present in the manifold 21. It is, therefore, apparent that the piston 42 has its position varied within the cylinder in accordance with changes in the velocity of fuel flow within the manifold 21 and the variation in pressure thereof.

The spring 47 functions to return the piston 42 to normal engine operating position or to the top of the cylinder when the engine is idling.

As the speed of the motor increases the resultant increase in velocity of the fuel will provide a depressed condition in the tube 49, and therefore, in the lower part of the cylinder, and the piston 42 is moved downwardly. The cam following levers 27 and 29 are shifted by the downward movement of the piston to produce the earlier opening time of the exhaust valves and delay the closing of the intake valve. Under normal load operation, the depressed condition, or vacuum condition, within the manifold 21 provides a suction in the tube 51 and in the cylinder 43 on the top of the piston 42 and tends to draw the piston upwardly within the cylinder. As the load increases, the depressed condition or vacuum becomes less on the top of the piston and the piston will be drawn downwardly by the suction therebelow. Such downward movement, as pointed out above, increases the arc of contact between the cams on the cam shaft and cam following levers to thereby vary the opening and closing positions of the exhaust and intake valves, respectively.

It may be experienced that the direct application of a force derived from the fuel velocity and pressure is not sufficiently reliable for moving the piston, or that a balance of force would vibrate the piston which would be objectionable. For this reason, I have illustrated a fluid system in combination with the piston and cylinder above mentioned for providing positive actuation of the lever arm 39. In this arrangement, the piston rod 41 when moved by the piston 42 actuated an arm 54 connected to the rotor of a valve 55 supported on a bracket 56. The valve is connected by a pipe 57 to the crank case, and a flexible tube 58 connects the opposite side of the valve to a cylinder through the top cover 52 thereof.

A supply of liquid under pressure is forced through a flexible tube 59 by suitable means herein illustrated as a gear type pump 61. The tube 59 is also connected to the top cover 52 of the cylinder 43', the piston of which is connected to a rod 62 having its end secured to the lever arm 39 on the stub shaft 37. Under normal operating conditions the piston rod 41 is drawn within the cylinder 43 and the by-pass valve 55 is open to permit the passage of fluid through the conduit 59 into the cylinder 43' and through the valve into the crank case. In the presence of changes in speed, throttle and load, the action of the piston under control of the fuel conditions will be the same as that described above relative to the structure illustrated in Fig. 5. The movement to the left of the piston within cylinder 43 operates the arm 54 to reduce the valve orifice, and therefore the flow of liquid therethrough. This causes the pressure to build up in the tube 59 and in the cylinder 43' in which oil is being conducted to thereby force the piston 42' thereof and the rod 62 downwardly to operate the plates 34 and 35 and the cam following levers 27 and 29 in the manner above referred to. The vibration which may occur in the structure illustrated in Fig. 5 is not only entirely eliminated, but a positive pressure of liquid is provided for forcing the piston downwardly to thereby overcome any resistance which might otherwise prevent the movement of the rod 41 when actuated by the slight changes of pressure which may occur on either side of the piston 42. As the engine returns to idle operation the orifice through valve 55 is again fully open and the pressure within the cylinder 43' is reduced. Thereupon the spring 47 will move the piston 42' upwardly, moving the piston rod 62 upwardly therewith which moves the cam following levers 27 and 29 to their original position, that for idling.

Figure 2:
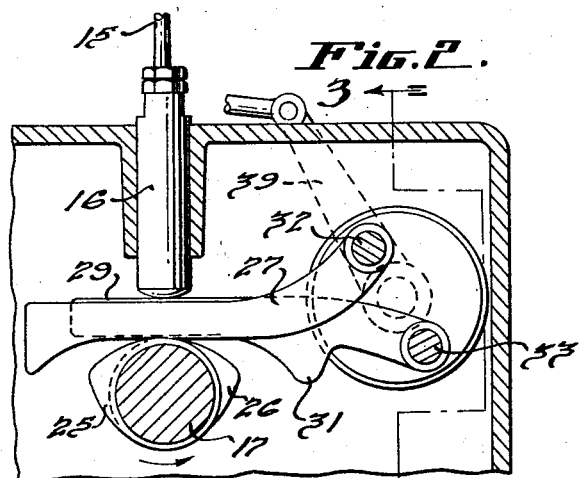
Fig. 2 is a view of structure similar to that illustrated in Fig. 1 with the levers thereof shifted from cam engaging position.

When operating the system under full automatic conditions the engine is started in the usual manner with the piston 42 moved to the top of the cylinder 43 to have the levers positioned as in Fig. 2 with the cams 28 and 31 spaced out of contact with the cams 25 and 26 and the engine will idle. As the speed and load on the engine increases, thereafter, the piston 42 moves downwardly in the cylinder since the preponderance of depression resulting from the velocity and pressure of the fuel, will provide the greatest suction force in the lower part of the cylinder below the piston. This movement produces the rocking of the lever arm and the plate 35 in a clockwise direction either directly as illustrated in Fig. 5, or through the fluid system as illustrated in Fig. 6. The cam following levers 27 and 29 are moved to have the cams 31 and 28 respectively, thereof, advanced into a position to be engaged by the cams 25 and 26. The increased arc of contact resulting from the advancement of the cam following levers advances the opening of the exhaust valves and delays the closing of the intake valves. It is to be understood that when a pair of cam following levers is employed on each cam 25 and 26 that the advance of opening and the delay of closing will occur to all of the valves of both sets.

While I have described and illustrated several embodiments of my invention, it will be apparent to those skilled in the art that various changes, omissions, additions and substitutions may be made therein without departing from the spirit and scope of my invention, as set forth in the accompanying claims.

What I claim is:

1. An internal combustion engine having a plurality of intake and exhaust valves including, in combination, a cam shaft having a plurality of cams thereon, tappets associated with each of said cams, means interconnecting said tappets to said valves for producing the operation thereof when the tappet is moved, cam following levers having a cam thereon disposed between the cams of the cam shaft and the tappets, means for shifting said levers to vary the degree of contact between the cams of said levers and those of the shaft, means for connecting the cam following levers for the exhaust valves to an actuating element, means for connecting the levers of the intake valves to another actuating element, and common means for operating said actuating elements simultaneously for moving said levers.

2. An internal combustion engine having a plurality of intake and exhaust valves including, in combination, a cam shaft having a plurality of cams thereon, tappets associated with each of said cams, means interconnecting said tappets to said valves for producing the operation thereof when the tappet is moved, cam following levers having a cam thereon disposed between the cams of the cam shaft and the tappets, means for shifting said levers to vary the degree of contact between the cams of said levers and those of the shaft, means for connecting the cam following levers for the exhaust valves to an actuating element, means for connecting levers of the intake valves to another actuating element, common means for operating said actuating elements simultaneously for moving said levers, and means responsive to engine operation for actuating said operating means.

3. An internal combustion engine having a plurality of intake and exhaust valves including, in combination, a cam shaft having a plurality of cams thereon, tappets associated with each of said cams, means interconnecting said tappets to said valves for producing the operation thereof when the tappet is moved, cam following levers having a cam thereon disposed between the cams of the cam shaft and the tappets, means for shifting said levers to vary the degree of contact between the cams of said levers and those of the shaft, means for connecting the cam following levers for the exhaust valves to an actuating element, means for connecting the levers of the intake valves to another actuating element, common means for operating said actuating elements simultaneously for moving said levers, and means responsive to engine operation for actuating said operating means, said responsive means embodying a cylinder and piston, a Pitot tube connected to the engine intake manifold and to the cylinder, and a tube connecting the opposite end of the cylinder to the manifold for producing movement to the piston in response to the resultant of the fuel velocity and its pressure within the manifold.

4. In an internal combustion engine having a valve in combination with means for opening said valve for a predetermined period, and additional means to vary the duration of the valve period by advancing the opening of the valve and retarding the closing of the valve.

5. In an internal combustion engine having intake and exhaust valves, in combination with means for operating said valves for predetermined periods, additional means to vary the duration of the valve periods by advancing the opening of the exhaust valves and retarding the closing of the intake valves, and common means for actuating the varying means to produce the said advancing and retarding simultaneously of the valves opening and closing respectively.

6. In an internal combustion engine having intake and exhaust valves, a cam shaft having cams thereon, tappets actuated by said cams to operate said valves, and slide bars each having a dwell and cam surface interposed between said cams and said tappets, means for adjusting said bars in a direction approximately normal to the direction of movement of said valves for controlling the period of valve operation without increasing the degree of opening thereof.

7. In an internal combustion engine having intake and exhaust valves, a cam shaft having cams thereon, tappets actuated by said cams to operate said valves, slide bars each having a cam surface thereon interposed between said cams and said tappets, and means for adjusting said bars in opposite directions to advance and retard the points of opening of the exhaust valve without increasing the degree of opening thereof.

8. In an internal combustion engine having intake and exhaust valves, a cam shaft having cams thereon, tappets actuated by said cams to operate said valves, slide bars each having cam surfaces thereon interposed between said cams and said tappets and means for adjusting said bars in opposite directions to advance and retard the point of opening of the intake valve without increasing the degree of opening thereof.

9. In an internal combustion engine having intake and exhaust valves, means for operating said valves, slide bars each having dwell and cam surfaces thereon interposed between said first means and said valve to control the duration of said intake and exhaust periods by advancing the opening of the exhaust valves and retarding the closing of the intake valves, a shaft to which said bars are eccentrically secured, and means for operating said shaft to shift said bars simultaneously in response to engine speed and load.

10. In an internal combustion engine having intake and exhaust valves, means for operating said valves, longitudinally adjustable bars having dwell and cam surfaces thereon interposed between said first means and said valves for varying the period of valve operation, a shaft to which said bars are eccentrically secured, and means responsive to engine operation for actuating said shaft.

11. In an internal combustion engine having intake and exhaust valves, means for operating said valves, additional means cooperating with said first means for varying the period of valve operation, a piston operating said additional means, and means responsive to engine operation for actuating said piston.

12. In an internal combustion engine having intake and exhaust valves, means for operating said valves, additional means cooperating with said first means for varying the period of valve operation, a piston operating said last means, means responsive to engine operation for actuating said piston, said last means being the resultant of velocity and pressure of the engine fuel.

13. In an internal combustion engine having a plurality of intake and exhaust valves, a rotatable shaft having cams thereon, tappets interposed between said cams and valves, cam following levers disposed between said cams and tappets, said cam following levers having cams thereon coacting with said cams of said shaft, means for simultaneously shifting said cam following levers to vary the relation of the cams and the period of valve actuation, a piston in a cylinder for actuating said cam following levers, a Pitot tube in the path of flow of engine fuel connected to the lower part of the cylinder, a conduit connected to the opposite side of the cylinder and to the engine manifold for applying the pressure of the fuel to the top of the piston, whereby changes in engine operation and throttle position will move the piston to have the valves operate in accordance with engine requirements.

14. In an internal combustion engine having a plurality of intake and exhaust valves, a rotatable shaft having cams thereon, tappets interposed between said cams and valves, cam following levers disposed between said cams and tappets, said cam following levers having cams thereon coacting with said cams of said shaft, means for simultaneously shifting said cam following levers to vary the relation of the cams and the period of valve actuation, a piston in a cylinder, a valve actuated by said piston, a Pitot tube in the path of flow of engine fuel connected to the lower part of the cylinder, a conduit connected to the opposite side of the cylinder and to the engine manifold for applying the pressure of the fuel to the top of the piston, a second piston and cylinder, said second piston being connected to said cam following levers, a supply of fluid conducted to said cylinder and valve, whereby changes in engine operation and throttle position will move the first said piston to operate said valve to control the pressure of fluid on said second piston which positions the cam following levers to have the valves operate in accordance with engine requirements.

CLINTON L. WALKER.